United States Patent
Pratl

(10) Patent No.: US 6,550,108 B2
(45) Date of Patent: Apr. 22, 2003

(54) ATTACHMENT LOOP FOR A HANDHELD DEVICE

(76) Inventor: Michael J. Pratl, 703 First St., Terrell, TX (US) 75345

( * ) Notice: Subject to any disclaimer, the term of this patent is extended or adjusted under 35 U.S.C. 154(b) by 0 days.

(21) Appl. No.: 09/894,596

(22) Filed: Jun. 28, 2001

(65) Prior Publication Data

US 2002/0166212 A1 Nov. 14, 2002

Related U.S. Application Data

(60) Provisional application No. 60/290,866, filed on May 14, 2001.

(51) Int. Cl.$^7$ .............................................. A44B 21/00
(52) U.S. Cl. .................. 24/3.13; 24/115 K; 24/265 AL
(58) Field of Search ...................... 24/265 AL, 265 CD, 24/265 R, 265 A, 265 BC, 714.8, 714.6, 714.9, 715, 715.1, 715.2, 115 K, 304, DIG. 11, 3.1, 3.2, 3.13; 410/101, 112; 248/499, 500, 205.3, 315, 690, 691; 16/408, 409, 445

(56) References Cited

U.S. PATENT DOCUMENTS

| | | | |
|---|---|---|---|
| 372,900 A | * | 11/1887 | Doty |
| 1,621,076 A | * | 3/1927 | Lotz |
| 2,005,569 A | | 6/1935 | Smith |
| 3,866,873 A | | 2/1975 | Bohli |
| 3,990,454 A | | 11/1976 | Schlesinger |
| 4,828,153 A | | 5/1989 | Guzik et al. |
| D308,465 S | | 6/1990 | Hietter |
| D314,133 S | * | 1/1991 | Issard |
| 5,323,996 A | | 6/1994 | Rendall |
| 5,347,693 A | | 9/1994 | Otrusina |
| 5,369,846 A | | 12/1994 | Suarez et al. |
| 5,398,855 A | | 3/1995 | Schaiewitz |
| 5,460,347 A | * | 10/1995 | Schacher |
| 5,488,759 A | | 2/1996 | Lim et al. |
| 5,511,702 A | | 4/1996 | Yang |
| 5,680,977 A | | 10/1997 | Burke |
| 5,690,262 A | | 11/1997 | Vardanega |
| 5,697,724 A | * | 12/1997 | Honma |
| 5,709,012 A | | 1/1998 | Ebashi |
| 5,774,948 A | * | 7/1998 | Petschke et al. |
| D398,777 S | | 9/1998 | Epstein |
| 5,832,910 A | | 11/1998 | Wolfrath et al. |
| 5,852,857 A | * | 12/1998 | Mark et al. |
| 5,927,580 A | | 7/1999 | Ward-Llewellyn |
| 5,938,137 A | * | 8/1999 | Poulson |
| 5,983,686 A | | 11/1999 | Lee |
| 6,082,600 A | | 7/2000 | Angus et al. |
| 6,094,566 A | | 7/2000 | Dasent et al. |
| 6,105,922 A | | 8/2000 | Derman |
| 6,123,240 A | | 9/2000 | Fowles et al. |
| 6,176,401 B1 | | 1/2001 | Lim |
| 6,179,025 B1 | | 1/2001 | Sutton |
| 6,186,057 B1 | | 1/2001 | Schwabe |
| 6,182,878 B1 | | 2/2001 | Racca |

FOREIGN PATENT DOCUMENTS

DE 19529468 * 2/1997

* cited by examiner

*Primary Examiner*—James R. Brittain
(74) *Attorney, Agent, or Firm*—Gardner Groff, P.C.

(57) ABSTRACT

An attachment loop for affixing to a handheld device. The attachment loop includes a self-adhesive base panel having a ring portion pivotally attached thereto. A segment of the ring portion is captured within a channel of the base panel. The base panel has an end profile generally matching the inside opening profile of the ring portion to permit the ring portion to lay flush against the surface of the handheld device.

14 Claims, 2 Drawing Sheets

ATTACHMENT LOOP FOR A HANDHELD DEVICE

CROSS-REFERENCE TO RELATED APPLICATION

This application claims the benefit of U.S. Provisional Patent Application Ser. No. 60/290,866, filed May 14, 2001, which is hereby incorporated in its entirety herein.

FIELD OF THE INVENTION

The present invention relates generally to attachment devices and methods of use thereof, and more particularly to a support loop for attachment to a cell phone or other handheld device, and a method of use thereof, to prevent the device from falling to the ground and suffering potential damage if dropped.

BACKGROUND OF THE INVENTION

Description of Related Art

Electronic handheld devices such as cellular phones, pagers, personal digital assistant organizers, cameras and the like have become increasingly popular. The size and weight of such devices have generally been reduced as a result of technological advance, to a point where users frequently carry one or more such devices in their pockets, in purses or bags, or clipped to their belts or other clothing. In the process of using and stowing these devices, it is not uncommon that the device slips from a user's hand and drops to the ground, often suffering damage that is expensive to repair and rendering the device inoperable.

Some handheld devices are provided with a wrist strap or lanyard that is permanently attached to the device, which a user may grip or wrap around their wrist to reduce the likelihood that the device will be dropped. Many handheld devices, however, do not include any such features, or the features provided are inconvenient to use or protrude from the device in an undesirable manner. Also, even if a device is provided with a wrist strap or lanyard, the user typically releases the strap or lanyard from their hand or wrist when stowing the device in a pocket or purse, which may be just the point in time when the likelihood of dropping the device is greatest.

Handheld devices such as wallets and electronic devices are also subject to loss or theft, which might be prevented by attachment to a user or to an external support. In addition, a handheld device loosely stowed in a purse, briefcase or bag may be difficult for the user to locate. If the device could be attached by a lanyard or cord to a handle or other portion of the bag, the user could more easily locate and retrieve the device.

Thus it can be seen that needs exist for an improved method and apparatus for reducing the likelihood of damage to a handheld device resulting from the user dropping the device. It is to the provision of an apparatus and method meeting these and other needs that the present invention is primarily directed.

SUMMARY OF THE INVENTION

The present invention provides an apparatus and method for protecting a handheld device from damage that otherwise might result from the user dropping the device. In preferred forms, the invention provides an attachment loop for affixing to a handheld device to permit the attachment of a lanyard or cord to catch the device before it hits the ground in the event the device is dropped. The invention also may be beneficial in reducing the likelihood of loss or theft of handheld devices, and assisting a user in locating and retrieving a handheld device from a purse, briefcase or bag. In preferred forms, the attachment loop of the present invention is easy to affix to most types of handheld devices, and permits attachment to a wide variety of lanyards and cords, such as elastic lanyards, spring-loaded self-retracting lanyards, and the like. In preferred forms, the attachment loop of the present invention is convenient to use, and collapses to generally flat configuration lying relatively flush with the surface of the device to which it is affixed.

In one aspect, the present invention is an attachment loop for affixing to a handheld device. The attachment loop preferably includes a base panel having a first end and a second end, a first side and a second side, and a first face and a second face. At least one of the first and second ends preferably has an exterior profile of curvature, and at least one of the first and second faces preferably defines a recess formed therein. The attachment loop preferably also includes a ring pivotally mounted to the base panel. The ring preferably includes a first portion captured within the recess of the base panel, and a second portion having an interior profile of curvature generally matching the exterior profile of curvature of the base panel.

In another aspect, the present invention is an attachment loop for affixing to a handheld device, the attachment loop preferably including a base panel having a first end and a second end, a first side and a second side, and a first face and a second face. At least one of the first and second faces preferably defines a recess formed therein. The attachment loop preferably also includes a ring mounted to the base panel. The ring preferably has a first portion captured within the recess of the base panel, and a second portion extending outwardly of the base panel.

In still another aspect, the present invention is an attachment loop for affixing to a handheld device, including a base panel having a first end and a second end, a first side and a second side, and a first face and a second face. At least one of the first and second ends has a first end geometry. The attachment loop preferably also includes a ring having a first portion pivotally mounted to the base panel, and a second portion comprising a loop defining an opening shaped to contain the first end geometry of the base panel.

In yet another aspect, the present invention is a method of connecting a handheld device to an external support element. The method preferably includes the steps of: affixing an attachment loop as described above to a handheld device; attaching a first end of a lanyard to the ring of the attachment loop; and attaching a second end of the lanyard to an external support element.

These and other objects, features and advantages of preferred forms of the present invention are described in greater detail herein with reference to preferred and example embodiments.

DETAILED DESCRIPTION

Figure 1:
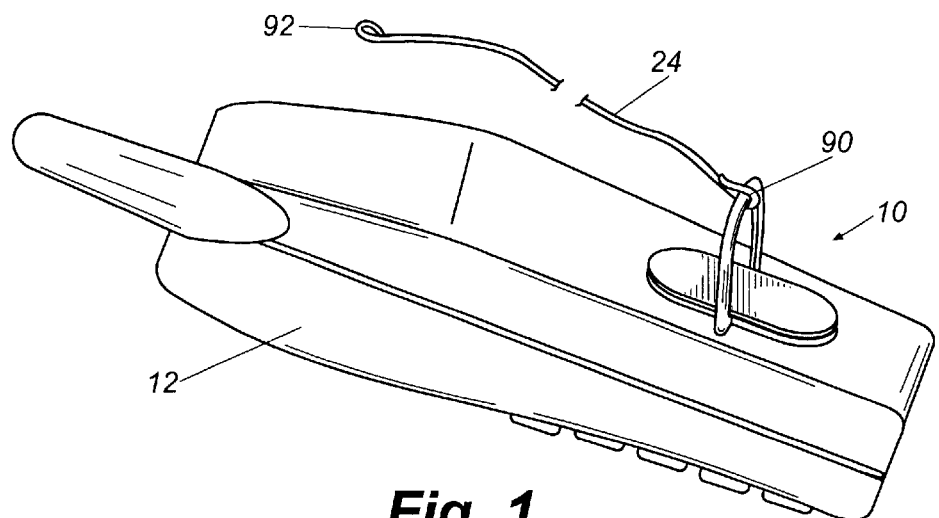
FIG. 1 is a perspective view of a handheld device having an attachment loop affixed thereto according to a preferred form of the present invention.

Referring now to the drawing figures, wherein like reference numerals represent like parts throughout, preferred forms of the present invention will now be described. As seen best with reference to FIGS. 1–4, in a preferred form, the invention comprises an attachment loop device 10 adapted to be affixed to a handheld device 12, such as a cellular telephone, a camera, a pager, a wallet, a toy, a personal digital assistant organizer, etc. The attachment loop 10 preferably comprises a base panel 20 for affixing to a surface of the handheld device 12, and a ring 22 mounted to the base panel for attachment to the first end of a lanyard 24 or other means for attaching the attachment loop 10 to an external support object.

Figure 2:
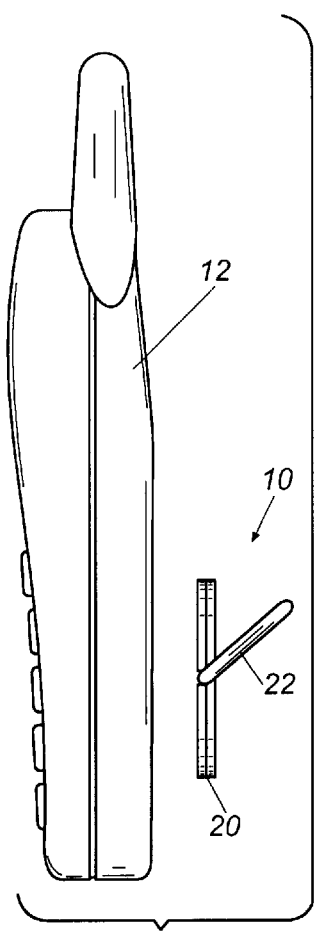
FIG. 2 is a side view of the handheld device and attachment loop of FIG. 1, prior to affixing the attachment loop to the handheld device.
Figure 3:
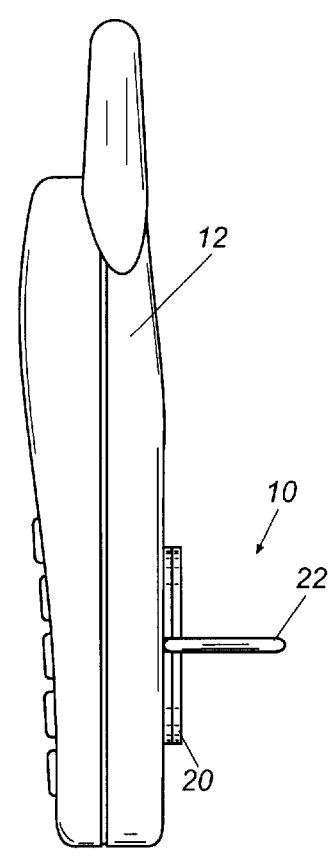
FIG. 3 is a side view of the handheld device and attachment loop of FIG. 1, with the attachment loop affixed to the handheld device and showing an extended position of the ring portion thereof.

As seen with reference to FIGS. 2 and 3, the attachment loop 10 is preferably separately fabricated from the handheld device 12, and is affixed to the handheld device as an aftermarket modification by the end user of the handheld device. Alternatively, the attachment loop 10 is integrally formed with the handheld device 12, or is affixed to the handheld device prior to delivery to the consumer. The attachment loop 10 is preferably affixed to the handheld device 12 by adhesive, such as a pressure-sensitive adhesive. Alternatively, the attachment loop 10 is affixed to the handheld device 12 by screws, rivet or other fasteners, by thermal or solvent welding, by hook-and-loop reclosable fasteners, and/or by other permanent or releasable affixing means. The affixing means is preferably selected to ensure adequate strength to support the weight of the handheld device 12 anticipated for use in connection with the attachment loop 10, and to ensure that the connection between the attachment loop and the handheld device remains intact if the device is dropped through the maximum distance that the handheld device might fall in its anticipated use. The affixing means preferably also provides sufficient strength to permit the user to locate and retrieve the handheld device 12 from within a purse, bag or other container by pulling on the lanyard 24.

Figure 5:
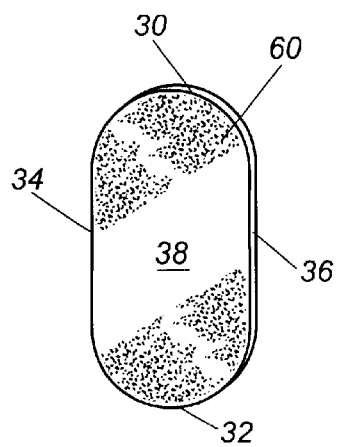
FIG. 5 is a perspective view of a body panel portion of an attachment loop according to a preferred form of the present invention.
Figure 6:
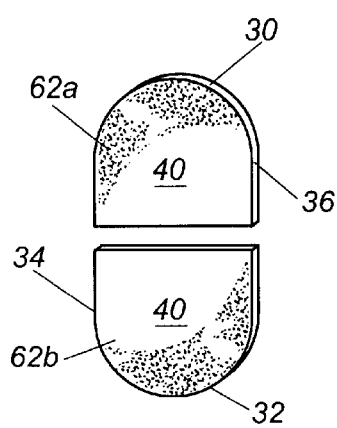
FIG. 6 is a perspective view of attachment panel portions of an attachment loop according to a preferred form of the present invention.
Figure 7:
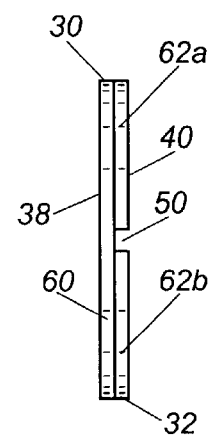
FIG. 7 is a side view of portions of a partially assembled attachment loop according to a preferred form of the present invention.
Figure 8A:
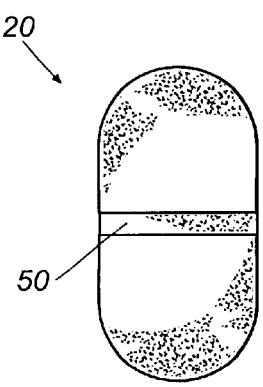
FIGS. 8a and 8b show portions of an attachment loop in an intermediate stage of assembly according to a preferred form of the present invention.
Figure 8B:
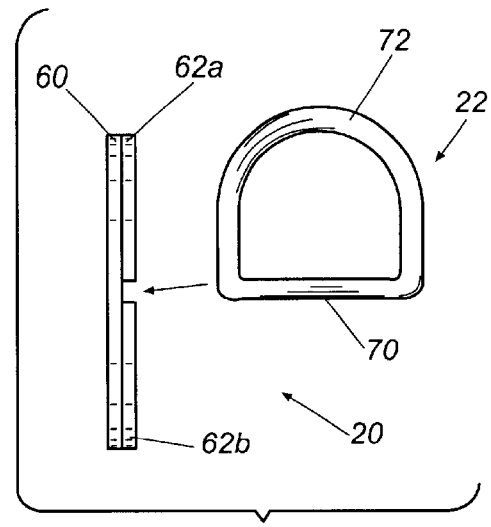
Figure 9:
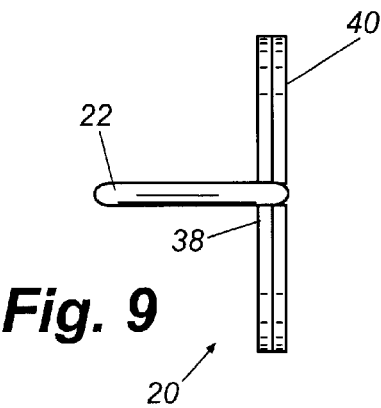
FIG. 9 is a side view of an assembled attachment loop according to a preferred form of the present invention.

Referring now to FIGS. 5–7, the base panel 20 preferably has a first end 30, a second end 32, a first side 34, a second side 36, a first face 38 and a second face 40. In the depicted embodiment the base panel 20 is a generally flat, oval-shaped panel when viewed from a direction normal to the first or second face 38, 40. In alternate embodiments the base panel 20 has a round, square, polygonal, rectangular, or other shape when viewed from a direction normal to the first or second face.

One or both of the first and second faces 38, 40 of the base panel 20 preferably defines at least one recess 50 formed therein for receiving a cooperating portion or portions of the ring 22, as will be further described below. In the depicted embodiment, the recess 50 comprises a channel extending across one of the first and second faces 38, 40, from the first side 34 to the second side 36. In alternate embodiments, one or both of the first and second faces 38, 40 of the base panel 20 define a first recess adjacent the first side 34, and a second recess adjacent the second side 36. The recess(es) 50 is/are preferably located approximately midway between the first and second ends 30, 32.

The base panel 20 preferably comprises a first layer of material 60 and a second layer of material 62, overlying and permanently or releasably attached to one another. Alternatively, the base panel 20 is formed as a unitary component, or comprises three or more layers. The first layer of material 60 comprises one face forming the first face 38 of the base panel 20, and another face for attachment to the second layer of material 62. The second layer of material 62 comprises one face forming the second face 40 of the base panel 20, and another face for attachment to the first layer of material 60. In a preferred embodiment, the second layer of material 62 comprises two halves 62a, 62b, which are spaced a distance from one another to define the channel 50. The first and second layers 60, 62 preferably have matching outer dimensions, whereby edges of the first and second layers align when attached to one another. In example embodiments of the invention, each of the first and second layers of material 60, 62 comprises an oval panel about 2½ cm end-to-end, 1 cm side-to-side, and 1–2 mm in thickness. The second layer 62 preferably has a central section of about 1 mm in length removed to form the two halves 62a, 62b. The first layer of material 60 is preferably formed from a flexible compressible foam such as polyurethane, polyethylene or other polymeric material. The second layer of material 62 preferably comprises a flexible double-sided adhesive such as double-sided tape. Most preferably, the second layer of material comprises a double-sided adhesive compressible foam-backed tape such as is commercially available from the 3M Corporation and other manufacturers.

Figure 4:
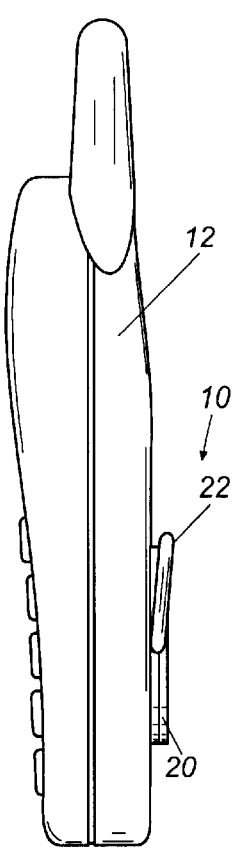
FIG. 4 is a side view of the handheld device and attachment loop of FIG. 1, with the attachment loop affixed to the handheld device and showing a lowered position of the ring portion thereof.

With reference to FIGS. 2–4, 8 and 9, the ring 22 is preferably pivotally mounted to the base panel 20, to permit the ring to move between a first position wherein a loop portion of the ring is extended outwardly from the base panel (see FIG. 3), and a second position wherein the loop portion of the ring is lowered a position along the base panel (see FIG. 4). FIG. 2 depicts the loop portion of the ring 22 in an intermediate position between the first and second positions. In a preferred embodiment, understood best with reference to FIGS. 8a and 8b, the ring 22 comprises a first portion 70 that is cooperatively engaged within the recess 50 formed in the second face 40 of the base panel 20, and a second portion 72 comprising the loop portion of the ring to which a lanyard 24 can be coupled. The first portion 70 of the ring 22 preferably fits within the recess 50 with a loose interference fit, whereby when the second face 40 of the base panel 20 is affixed to the handheld device 12, the ring is captured within the recess and is pivotally movable between its first and second positions with light finger pressure, but is held in place by friction between the ring and the base panel in the absence of external force. In alternate embodiments of the invention, the ring 22 is engaged by or otherwise attached to the first layer 60 and/or the second layer 62, or is otherwise coupled to the base panel 20.

In one preferred form of the invention, the ring 22 is a metal or plastic D-ring, having a generally straight first portion 70 and a curved second portion comprising a generally semi-circular loop portion. In this embodiment, the first portion 70 of the ring extends through a channel 50 formed in the base panel 20, continuously from the first side 34 to the second side 36. In an alternate form of the invention, the ring 22 is generally C-shaped, and the first portion 70 comprises two opposed fingers with a gap therebetween; one finger for engagement within a first recess adjacent the first side 34, and the other finger for engagement within a second recess adjacent the second side 36. In example embodiments, the thickness of the material forming the ring 22 is about 1 mm.

In further preferred embodiments of the invention, one or both of the first and second ends 30, 32 of the base panel 20 comprise(s) an end geometry for cooperation with an opening geometry of the loop portion 72 of the ring 22, to enable the ring 22 to be lowered to a position laying generally flush with the surface of the handheld device 12 to which the attachment loop 10 is affixed. For example, in the depicted embodiment, the first and second ends 30, 32 of the base panel 20 have a generally semi-oval exterior profile of curvature, and the loop portion 72 of the ring 22 defines an opening having an interior profile of curvature generally matching the exterior profile of curvature of the ends of the base panel. The halves 62a and 62b of the second layer of the base panel 20 define end geometries that are mirror images of one another arranged on opposite sides of the central channel 50, whereby the ring 22 can pivot in a first direction to a first lowered position wherein the opening of the loop portion 72 of the ring surrounds and contains the first half 62a, and can pivot in a second direction to a second lowered position wherein the opening of the loop portion 72 of the ring surrounds and contains the second half 62b. Although the embodiment of the invention depicted in the drawing figures shows a base panel 20 having end geometries with generally semi-oval exterior profiles of curvature, and a ring 22 having a semi-oval interior profile of curvature, it will be understood that the invention is not so limited and also comprehends end geometries and rings having other cooperating profiles of curvature, including square, rectangular, polygonal and/or circular profiles of curvature. Virtually any end geometry of the base panel 20 can be provided in combination with a cooperating opening geometry of the ring 22 that is appropriately sized and shaped to contain that base panel end geometry, and thereby allow the ring 22 to be lowered to a position generally flush with the surface of the handheld device. It is preferable that the interior profile of curvature of the ring 22 generally match at least a portion of the exterior profile of curvature of the base panel 20, for improved aesthetics and to prevent foreign objects from collecting or lodging between the base panel and the ring.

In further preferred embodiments of the invention, the interior profile of curvature of the ring 22 closely conforms to at least a portion of the exterior profile of curvature of the base panel 20. In this manner, friction between the base panel 20 and the ring 22 may serve to retain the ring in a lowered position where it is less obtrusive during use of the handheld device. This advantage of the invention is further enhanced if the base panel 20 comprises a compressible material, whereby the base panel is slightly compressed against the ring 22 and conforms somewhat to the outer geometry of the ring.

The present invention also comprises a method of fabricating an attachment loop substantially as described above. The method of fabrication first comprises forming the base panel 20. Compressible material such as polymeric foam is preferably cut or molded to the desired shape to form the first layer 60 of the base panel 20. Halves 62a, 62b of the second layer 60 are then formed, preferably by cutting the desired shapes from a double-sided adhesive foam tape. One cover layer of each half 62a, 62b is removed to expose the adhesive, the edges of the halves 62a, 62b are aligned with the edges of the first layer 60, and the halves are adhesively secured to the first layer 60. The other cover layer of each half 62a, 62b is left in place over the adhesive of the tape until ready to affix the final product to the handheld device 12. The halves 62a, 62b are spaced a distance from one another to form the channel 50. The ring 22 is then mounted to the base panel 20 by placement of the first portion 70 of the ring within the channel 50. The portion of the first layer 60 adjacent the channel 50 lies within the opening of the ring 22. A piece of single-sided adhesive tape is applied over the second face 40 of the base panel 20 across the channel 50 (adhered to the cover layer of each half 62a, 62b), to retain the ring 22 in the channel 50 until ready to affix the attachment loop 10 to a handheld device 12. Because this layer of tape is attached to the cover layer of each half 62a, 62b, both sections of cover layer can be removed in a single operation. Alternatively, the cover layer of each half 62a, 62b is removed, and a single cover sheet of release paper is applied over the adhesive of both halves, bridging the channel 50 and retaining the ring 22 therein. In alternate embodiments, the method of fabrication includes mounting the ring 22 to the base 20 by engaging the ring with the first layer 60 and/or the second layer 62. The attachment loop 10 is then ready for packaging and delivery.

When the user desires to place the attachment loop 10 into use, the cover layer is removed to expose the adhesive of the second face 40, and the second face is affixed to the desired surface of the handheld device. If the ring is not otherwise retained to the base, care must be taken to keep the ring 22 engaged within the channel 50 prior to affixing the base to the handheld device. The first portion 72 of the ring 22 is thereby captured between the handheld device 12 and the first layer 60 of the base panel 20. If the attachment loop 10 is not coupled to a lanyard, the ring 22 is preferably lowered to a position along the base panel 20 where it is less obtrusive during use of the handheld device. To couple the attachment loop 10 to a lanyard, the ring 22 is raised to a position extending outwardly from the base panel 20, and a first end of the lanyard 24 is attached to the ring 22. The second end of the lanyard 24 is then attached to an external support element.

The lanyard 24 preferably comprises first attachment means 90 at its first end for coupling the lanyard to the ring 22, and second attachment means 92 at its second end for coupling the lanyard to an external support element. Each attachment means 90, 92 preferably comprises a clip, a loop, a knot, a hook, or other form of permanent or detachable coupling. The lanyard 24 can take any of a variety of forms, including a spring-wound, self retracting lanyard, a cord, a chain, a length of string or rope, etc. The material of the lanyard 24 is selected to provide sufficient tensile strength to resist anticipated applied loads, and the length of the lanyard is selected to prevent the handheld device 12 from impacting the ground or other underlying surface if dropped, thereby protecting the handheld device from damage. The lanyard also may serve to locate a handheld device that is stored in a purse or other container by following the lanyard from the point of attachment at its second end to the first end of the lanyard, which is attached to the device. The lanyard may also be used to retrieve a handheld device by pulling on the lanyard.

The above description and appended drawings are representative of example embodiments of the present invention. The full spirit and scope of the invention, however, is not limited to any particular embodiment or embodiments. Thus, it will be readily apparent to those of ordinary skill in the art that many additions, modifications and deletions can be made to the described embodiments without departing from the spirit and scope of the invention.

What is claimed is:

1. An attachment loop for affixing to a handheld device, comprising:
    a base panel having a first end and a second end, a first side and a second side, and a first face and a second face, at least one of said first and second ends having an exterior profile of curvature, and at least one of said first and second faces defining a recess formed therein; and
    a ring pivotally mounted to said base panel, said ring comprising a first portion captured within the recess of said base panel, and a second portion having an interior profile of curvature generally matching the exterior profile of curvature of said base panel;
    wherein the recess formed in said base panel is a channel extending across one of said first and second faces, from the first side to the second side, and wherein said base panel comprises a first layer of material comprising said first face and a second layer of material comprising said second face, said first and second layers being attached to one another, and wherein said second layer of material comprises two halves spaced a distance from one another to define the channel across said base panel.

2. The attachment loop of claim 1, wherein said ring is a D-ring having a generally straight portion captured within the channel across said base panel.

3. The attachment loop of claim 1, wherein at least one of said first and second layers of material comprise a compressible material.

4. The attachment loop of claim 1, wherein said second layer of material comprises a double-sided adhesive.

5. An attachment loop for affixing to a handheld device, comprising:
    a base panel having a first end and a second end, a first side and a second side, and a first face and a second face, at least one of said first and second faces defining a recess formed therein; and
    a ring mounted to said base panel, said ring comprising a first portion captured within the recess of said base panel, and a second portion extending outwardly of said base panel;
    wherein the recess formed in said base panel is a channel extending across one of said first and second faces from the first side to the second side, and wherein said base panel comprises a first layer of material comprising said first face and a second layer of material comprising said second face, wherein said second layer of material comprises two halves spaced a distance from one another to define the channel across said base panel.

6. The attachment loop of claim 5, wherein said ring is a D-ring having a generally straight portion captured within the channel across said base panel, whereby said D-ring is pivotally mounted to said base panel.

7. The attachment loop of claim 5, wherein at least one of said first and second layers of material comprise a compressible material.

8. The attachment loop of claim 5, wherein said second layer of material comprises a double-sided adhesive.

9. The attachment loop of claim 5, wherein at least one of said first and second ends of said base panel has an exterior profile of curvature, and wherein the second portion of said ring has an interior profile of curvature closely conforming to at least a portion of the exterior profile of curvature of said base panel.

10. An attachment loop for affixing to a handheld device, comprising:
    a base panel having a first end and a second end, a first side and a second side, and a first face and a second face, at least one of said first and second ends having a first end geometry;
    a ring comprising a first portion pivotally mounted to said base panel, and a second portion comprising a loop defining an opening shaped to contain the first end geometry of said base panel; and
    a channel extending across one of said first and second faces;
    wherein the first portion of said ring is captured within said channel, and wherein said base panel comprises a first layer of material comprising said first face and a second layer of material comprising said second face, said second layer of material comprising two halves spaced a distance from one another to define the channel.

11. The attachment loop of claim 10, wherein said first end geometry comprises an exterior profile, and said opening of the ring comprises an interior profile generally matching at least a portion of the exterior profile of curvature.

12. The attachment loop of claim 10, wherein at least one of said first and second layers of material comprise a compressible material.

13. The attachment loop of claim 10, wherein said second layer of material comprises a double-sided adhesive.

14. The attachment loop of claim 10, in combination with a lanyard having a first end comprising first attachment means for attachment to said ring and a second end comprising second attachment means for attachment to an external support element.

* * * * *